Sept. 23, 1958     S. BOUSKY     2,853,392
CERAMIC DIELECTRIC MATERIALS
Filed Aug. 26, 1954
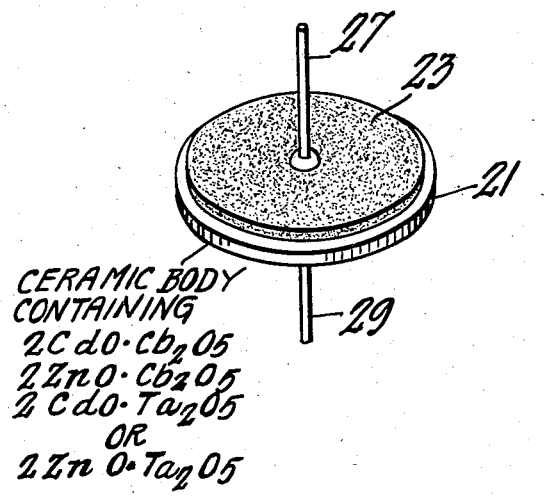
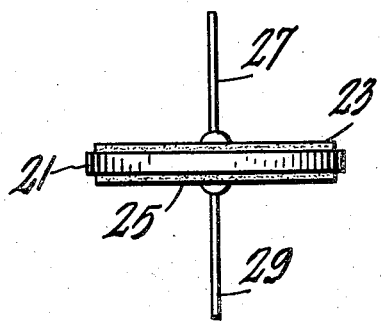
INVENTOR.
Samuel Bousky
BY
ATTORNEY

United States Patent Office 2,853,392
Patented Sept. 23, 1958

2,853,392

CERAMIC DIELECTRIC MATERIALS

Samuel Bousky, River Grove, Ill., assignor to Radio Corporation of America, a corporation of Delaware Application August 26, 1954, Serial No. 452,435

18 Claims. (Cl. 106—46)

This application is a continuation in part of U. S. application Serial No. 229,533 (now abandoned) filed June 1, 1951, by applicant and assigned to the same assignee as the instant application.

This invention relates to novel ceramic materials having unusually high values of dielectric constants. The invention also relates to methods of making the novel materials.

Vitreous, ceramic dielectric materials comprising columbates or tantalates of the alkali and alkaline earth metals have been described in a copending application of Eugene Wainer, Serial No. 159,094 (now abandoned) filed April 29, 1950, assigned to the same assignee as the instant application. The alkali and alkaline earth metal ceramic, vitreous columbates or tantalates are particularly noteworthy and useful because they are good insulators with high resistivities and low power factors.

As used in this specification, the terms "vitreous" and "vitrified" describe that condition of a ceramic whiteware body when its absorption is 0.5% or less by standard tests. The term "vitrification" refers to the progressive reduction in porosity of a ceramic composition as a result of heat treatment, or to the process involved. These definitions are in accord with the definitions adopted by the American Society for Testing Materials under the designation C242–55.

One object of the present invention is to provide novel ceramic materials having high dielectric constants and other good insulative properties.

Another object of the invention is to provide novel ceramic materials particularly useful in making capacitors.

Another object of the invention is to provide novel ceramic materials adapted to be used in temperature compensative devices.

Another object of the invention is to provide novel materials exhibiting ferroelectric properties.

Another object of the invention is to provide novel vitreous ceramic materials particularly adapted to be used with other materials of the same class, as modifiers.

Still another object of the invention is to provide novel ceramic materials having improved piezoelectric properties.

These and other objects will be more apparent and the invention will be more readily understood from the detailed description which includes examples of specific embodiments.

In general, the invention relates to vitreous ceramic materials substantially having the composition $2XO.Y_2O_5$ where X is either cadmium or zinc and Y is either columbium or tantalum and dielectric bodies including said materials. The invention also includes materials and dielectric bodies including materials of this general description including minor percentages by weight of other materials such as barium carbonate, columbium pentoxide, and fluxes such as lead borate. Also included in the invention are methods of making these materials, by calcining either oxides or oxide-yielding compounds of the metals included in the product, and then firing the calcine to vitrification temperature. The invention also includes devices comprising the dielectric bodies of the invention.

The invention will be more fully described in the following detailed description in connection with the attached drawing in which:

Figure 1 is a perspective view of a device of the invention and

Figure 2 is an elevational view of the device of Figure 1.

A specific example of how vitreous, ceramic cadmium columbate or tantalate may be prepared will now be given.

EXAMPLE 1

Two moles of pure cadmium oxide are mixed with one mole of columbium oxide and the mixture is ground to an impalpable powder. The powder is then calcined in air or oxygen to a temperature of about 2100° F. for about 20 to 45 minutes. Optimum properties are obtained by using the lowest possible temperature of calcination, the shortest time at the peak temperature, and the highest obtainable oxidation potential. The product is a yellow colored powder. Instead of the metallic oxides, compounds which can be readily decomposed thermally to yield the desired oxides can be used to prepare the calcine. For example, the acetate, oxalate, or carbonate of the metals may be mixed together in suitable molar proportions and calcined as above described.

The calcine is again ground to an impalpable powder, preferably mixed with a temporary binder such as a water solution of either polyvinyl alcohol or methyl cellulose, pressed into some desired shape, and then fired to vitrification temperature. The vitrification temperature is about 2400° to 2450° F., and the firing may take place in any oxygen-containing oxidizing atmosphere.

Again, the lower the temperature of vitrification used, the shorter the firing time at peak temperature, and the higher the oxidation potential of the atmosphere used in firing the better are the properties resulting in the product. Hence, oxygen is preferred for the firing atmosphere. Table 1 below gives data on several examples of preparation.

Table 1

COLUMBATE AND TANTALATE OF CADMIUM

| Composition | Calcination Temperature, ° F. | Atmosphere | Firing Temp., ° F. | Dielectric Constant K after aging | Electrical Dissipation Factor D after aging |
|---|---|---|---|---|---|
| 1. $2CdO \cdot Cb_2O_5$ | 2,100 | air | 2,400 | 153 | 0.015 |
| 2. $2CdO \cdot Cb_2O_5$ | 2,100 | $O_2$ | 2,400 | 502 | 0.009 |
| 3. $2CdO \cdot Cb_2O_5$ | 2,100 | $O_2$ | 2,450 | 350 | 0.110 |
| 4. $2CdO \cdot Ta_2O_5$ | 2,300 | air | 2,400 | 101 | 0.19 |
| 5. $2CdO \cdot Ta_2O_5$ | 2,300 | $O_2$ | 2,400 | 140 | 0.08 |
| 6. $2CdO \cdot Ta_2O_5$ | 2,300 | $O_2$ | 2,450 | 100 | 0.21 |

From the above table, it will be noted that cadmium columbate was prepared with much higher dielectric constant, K, than cadmium tantalate. Materials having dielectric constants of over 500 may readily be prepared in the case of the columbate. In general, the columbate has the better insulating properties of the two.

Both the columbate and the tantalate are ferroelectric and exhibit piezoelectric properties at temperature levels considerably below room temperature.

Breakdown strength of properly prepared cadmium columbates and tantalates is about 75 volts per mil.

The temperature coefficients of cadmium columbate between 20° C. and 120° C. are uniformly negative and linear. The dielectric constant drops from about 510 at 20° C. to about 335 at 120° C. No high temperature Curie point has been found with measurements made up to 200° C. On the other hand, the dielectric constant is of the order of 1150 at $-55°$ C. and a Curie point at about $-100°$ C. is indicated. Thus, the columbate and tantalate of cadmium are the dielectric analogues of strontium titanate.

The optimum properties of the materials are not always present immediately after firing. The desirable properties can be introduced, however, in either one of two ways. The fired bodies may be permitted to age at room temperature for about 2 weeks to a month. At the end of the aging period, the values of dielectric constant and electrical dissipation factor will be found to agree with those found in Table 1. The second way to develop the desirable properties in less time is to anneal the bodies at temperatures of about 800° to 1000° F. for about 15 minutes. In general, this may be described as a brief period of low temperature annealing.

The vitreous, ceramic zinc columbates and tantalates are prepared by the same general method as the corresponding cadmium compounds.

EXAMPLE 2

Two moles of ZnO are mixed with one mole of $Cb_2O_5$. Alternatively, compounds which are thermally decomposable to yield the oxides may be used. The ingredients, preferably in the form of dry impalpable powders, are ground until the powders are completely mixed. The mixture is calcined at about 1800° F. for a few minutes in an oxygen containing oxidizing atmosphere, preferably composed entirely of oxygen, and cooled quickly.

The crystalline product which develops is white to yellow in color. This material is ground to a particle size such that it will pass a 325 mesh screen, mixed with a temporary binder such as an aqueous solution of polyvinyl alcohol or methyl cellulose, pressed into some desired shape, and then fired to vitrification temperature for preferably about 30 minutes to 1 hour. Again, the firing is carried out preferably in an atmosphere of oxygen, but alternatively in any oxygen-containing oxidizing atmosphere. The best results are obtained if the body is fired at the lowest maturation temperature possible for the shortest length of time to develop complete vitrification.

Firing for too long a period or at too high a temperature usually causes a sharp decrease in dielectric properties. On the other hand, the dielectric properties are brought to their optimum by either aging at room temperature for several weeks or annealing at about 800° to 1000° F. for a few minutes in air.

Properties of typical examples of the zinc columbate and tantalate are given in Table 2 below.

Table 2
COLUMBATE AND TANTALATE OF ZINC
[Aged after firing in oxygen]

| | Firing Temp. | K | D |
|---|---|---|---|
| 1. $2ZnO \cdot Cb_2O_5$ | 2,100 | 60 | 0.035 |
| 2. $2ZnO \cdot Ta_2O_5$ | 2,200 | 57 | 0.042 |

The columbates and tantalates of zinc are good insulative bodies and have dielectric constants of about 60. They exhibit uniform and slightly negative temperature coefficients with Curie points considerably below room temperature. They are useful in making temperature compensative type capacitors and as additions to other columbates and tantalates or materials of similar structure which have Curie points considerably above room temperature.

It has also been found that the dielectric properties of either cadmium columbate or cadmium tantalate can be improved substantially by the addition of barium carbonate to the calcine and then firing to vitrification. By adding from 1 to 10% by weight of barium carbonate an increase in dielectric constant of up to about 20% can be obtained.

EXAMPLE 3

Cadmium columbate is first made by calcining the oxides as described in Example 1. From 1 to 10% by weight of pure precipitated barium carbonate is then added to the calcine. The material is thoroughly mixed and a temporary binder, such as an aqueous solution of polyvinyl alcohol or methyl cellulose, added. The material is then pressed into a body of desired shape and fired and later annealed or aged as described in the previous examples. Firing temperature is lowered due to the presence of the barium compound.

Table 3, below, gives results of adding various percentages of the carbonate.

Table 3

| Composition | Firing Temp. | (aged) K | (aged) D |
|---|---|---|---|
| 1. $2CdO \cdot Cb_2O_5$ | 2,400 | 505 | 0.009 |
| 2. $2CdO \cdot Cb_2O_5 + 1\% BaCO_3$ | 2,400 | 605 | 0.017 |
| 3. $2CdO \cdot Cb_2O_5 + 2\% BaCO_3$ | 2,350 | 605 | 0.015 |
| 4. $2CdO \cdot Cb_2O_5 + 3\% BaCO_3$ | 2,200 | 595 | 0.017 |
| 5. $2CdO \cdot Cb_2O_5 + 5\% BaCO_3$ | 2,100 | 609 | 0.02 |
| 6. $2CdO \cdot Cb_2O_5 + 10\% BaCO_3$ | 2,100 | 650 | 0.04 |
| 7. $2CdO \cdot Cb_2O_5 + 20\% BaCO_3$ | 2,100 | 310 | 0.15 |

The temperature coefficients of these products are negative but not to any marked extent. For example, the temperature coefficient of a 5% addition of barium carbonate after aging is derived from the following observed data. The value of dielectric constant at 10° C. is 700, decreasing to 550 at 120° C. The dielectric constant is still dropping at 120° C. but the dissipation factor is also dropping. There is no perceptible Curie point up to and including 200° C.

The same results have, in general, been observed with cadmium tantalate and with zinc columbate or tantalate, but the properties do not exhibit quite as high a level of values.

EXAMPLE 4

Cadmium columbate or tantalate and zinc columbate or tantalate can be further improved in dielectric properties by adding controlled amounts of excess columbium pentoxide, $Cb_2O_5$. The amount of $Cb_2O_5$ which it is preferred to add is 1 to 2% by weight in excess of normal stoichiometric proportions in the case of the columbates or just 1 to 2% by weight in the case of the tantalates. Adding more than this causes a considerable decrease in dielectric constant of the product.

The $Cb_2O_5$ is added to the calcine and the mixture is fired as usual to vitrification. Temporary binders may be added before pressing into desired shape.

Table 4, below, gives results of adding various percentages of $Cb_2O_5$ to $2CdO \cdot Cb_2O_5$.

Table 4
[All samples aged after firing in $O_2$]

| Composition | Firing Temp. | K | D |
|---|---|---|---|
| 1. $2CdO \cdot Cb_2O_5$ | 2,400 | 505 | 0.010 |
| 2. $2CdO \cdot Cb_2O_5 + 1\% Cb_2O_5$ | 2,400 | 625 | 0.013 |
| 3. $2CdO \cdot Cb_2O_5 + 2\% Cb_2O_5$ | 2,400 | 700 | 0.133 |
| 4. $2CdO \cdot Cb_2O_5 + 3\% Cb_2O_5$ | 2,400 | 361 | 0.08 |
| 5. $2CdO \cdot Cb_2O_5 + 5\% Cb_2O_5$ | 2,400 | 308 | 0.20 |
| 6. $2CdO \cdot Cb_2O_5 + 7\% Cb_2O_5$ | 2,400 | 287 | 0.16 |
| 7. $2CdO \cdot Cb_2O_5 + 10\% Cb_2O_5$ | 2,400 | 249 | 0.09 |

It will be seen from the above table that use of small percentages of $Cb_2O_5$ can improve the dielectric constant of vitreous, ceramic cadmium columbate by as much as 40%. The $Cb_2O_5$ does not function as a flux but appears to aid in producing a more perfect structure for development of the property in question.

EXAMPLE 5

Still another way in which the properties of the zinc or cadmium columbates or tantalates of the present invention can be improved is by using small percentages of various fluxes. For example, use of small percentages of lead borate not only reduces the temperature of vitrification but improves the dielectric and insulative properties of the product. The materials are prepared exactly as previously described, the flux being added to the calcine.

Table 5

[All samples aged after firing in $O_2$]

| Composition | Firing Temp. | K | D |
|---|---|---|---|
| 1. $2CdO.Cb_2O_5$ | 2,400 | 505 | 0.020 |
| 2. $2CdO.Cb_2O_5+1\%$ lead borate | 2,300 | 615 | 0.010 |
| 3. $2CdO.Cb_2O_5+3\%$ lead borate | 2,300 | 590 | 0.014 |

Boric acid may also be used as a flux. In general, percentages of flux not exceeding about 3% are preferred. Examples of other suitable fluxes are: potash feldspar, barium borosilicate, powdered soda lime glass, ball clay, and the like. These fluxes should be used to the extent of up to about 2% by weight of the composition.

Referring now to Figures 1 and 2, a device of the invention may comprise a thin, circular disc 21 of the dielectric body of the invention having a pair of electrodes 23 and 25 attached to opposite faces of the disc 21. Lead wires 27 and 29 are attached to electrodes 23 and 25 respectively, for example by soldering. The devices of the invention may be manufactured according to known techniques for the manufacture of analogous devices embodying other ceramic bodies. In a preferred device, the electrodes are prepared by applying conventional silver paste to the ceramic body and then firing the applied paste to produce an adherent, durable, solid, conductive coating.

The devices of the invention may be utilized as electric capacitators in which case the dielectric properties of the bodies of the invention are used. Or, the devices of the invention may be utilized as piezoelectric devices in which case the piezoelectric properties of the bodies of the invention are used.

What is claimed is:

1. A vitreous ceramic dielectric body of sintered finely-divided particles, said particles consisting essentially of one substance selected from the class consisting of cadmium columbate, cadmium tantalate, zinc columbate and zinc tantalate.

2. A vitreous ceramic dielectric body according to claim 1 wherein said substance is cadmium columbate.

3. A vitreous ceramic dielectric body according to claim 1 wherein said substance is cadmium tantalate.

4. A vitreous ceramic dielectric body according to claim 1 wherein said substance is zinc columbate.

5. A vitreous ceramic dielectric body according to claim 1 wherein said substance is zinc tantalate.

6. A vitreous ceramic body having a relatively high dielectric constant made by a process which comprises: (1) calcining in an oxidizing atmosphere a mixture consisting essentially of about two mole parts of a first oxide selected from the class consisting of cadmium oxide and zinc oxide and about one mole part of a second oxide selected from the class consisting of columbium oxide and tantalum oxide and then (2) firing a shaped body of the calcine in an oxidizing atmosphere to a vitrification temperature of at least 2100° F.

7. A vitreous ceramic dielectric body according to claim 6 wherein said shaped body includes between about 1% and 10% by weight of barium carbonate in addition to said calcine.

8. A vitreous ceramic dielectric body according to claim 6 wherein said shaped body includes between about 1% and 3% by weight of lead borate in addition to said calcine.

9. A vitreous ceramic dielectric body according to claim 6 wherein said shaped body includes between about 1% and 2% by weight of columbium oxide in addition to said calcine.

10. An electric device comprising a vitreous ceramic dielectric body of sintered finely-divided particles, said particles consisting essentially of one substance selected from the group consisting of cadmium columbate, cadmium tantalate, zinc columbate and zinc tantalate, and a pair of electrodes attached to said body.

11. An electric device according to claim 10 wherein said substance is cadmium columbate.

12. An electric device according to claim 10 wherein said substance is cadmium tantalate.

13. An electric device according to claim 10 wherein said substance is zinc columbate.

14. An electric device according to claim 10 wherein said substance is zinc tantalate.

15. An electric device comprising a pair of electrodes spaced by a vitreous ceramic body having a relatively high dielectric constant, said body made by a process which comprises: (1) calcining in an oxidizing atmosphere a mixture consisting essentially of about two mole parts of a first oxide selected from the class consisting of cadmium oxide and zinc oxide and about one mole part of a second oxide selected from the class consisting of columbium oxide and tantalum oxide and then (2) firing a shaped body of the calcine in an oxidizing atmosphere to a vitrification temperature of at least 2100° F.

16. An electric device according to claim 15 wherein said shaped body includes between about 1% and 10% by weight of barium carbonate in addition to said calcine.

17. An electric device according to claim 15 wherein said shaped body includes between about 1% and 3% by weight of lead borate in addition to said calcine.

18. An electric device according to claim 15 wherein said shaped body includes between about 1% and 2% by weight of columbium oxide in addition to said calcine.

References Cited in the file of this patent

UNITED STATES PATENTS

| | | |
|---|---|---|
| 2,584,324 | Bousky | Feb. 5, 1952 |
| 2,646,359 | Wainer | July 21, 1953 |

OTHER REFERENCES

Journal American Chemical Society, No. 30, pages 1649 and 1650, 1908.

Science, vol. 113, May 1851, pages 591–596.

J. America Ceramic Society, vol. 35, No. 8, August 1952 (pp. 207–214).

Mellor's "Comprehensive Treatise on Inorganic and Theoretical Chemistry" (1929), vol. 9, page 866.